United States Patent
Kawai et al.

(10) Patent No.: US 7,409,146 B2
(45) Date of Patent: Aug. 5, 2008

(54) DIGITAL RECORDING DEVICE CAPABLE OF CONVERTING AND RECORDING RESOLUTION OF IMAGE DATA OF DIGITAL TELEVISION BROADCAST AND RECORDING METHOD THEREFOR

(75) Inventors: Masanori Kawai, Daito (JP); Toshihiro Takagi, Daito (JP); Manabu Yamamoto, Daito (JP)

(73) Assignee: Funai Electric Co., Ltd., Daito-shi, Osaka (JP)

(*) Notice: Subject to any disclaimer, the term of this patent is extended or adjusted under 35 U.S.C. 154(b) by 1017 days.

(21) Appl. No.: 10/365,356

(22) Filed: Feb. 12, 2003

(65) Prior Publication Data

US 2003/0152361 A1 Aug. 14, 2003

(30) Foreign Application Priority Data

Feb. 14, 2002 (JP) ............................ 2002-037169

(51) Int. Cl.
*H04N 5/91* (2006.01)
*H04N 7/01* (2006.01)

(52) U.S. Cl. .................. 386/131; 386/46; 386/111; 725/100

(58) Field of Classification Search ............. 386/131, 386/111, 46; 725/100
See application file for complete search history.

(56) References Cited

U.S. PATENT DOCUMENTS 6,483,609 B1 * 11/2002 Ueno et al. ............... 358/434
6,671,454 B1 * 12/2003 Kaneko et al. ............... 386/83
2002/0039483 A1 * 4/2002 Frost et al. ............... 386/109

FOREIGN PATENT DOCUMENTS

| JP | 11-331613 | | 11/1999 |
| JP | 2001-94935 | | 4/2001 |
| JP | 2001094935 | * | 4/2001 |
| JP | 2001094935 A | * | 4/2001 |
| JP | 2001-128170 | | 5/2001 |
| JP | 2001-243708 | | 9/2001 |
| JP | 2002-44609 | | 2/2002 |

OTHER PUBLICATIONS

Office Action for Japanese Application No. 2002-037169, Mailed Jul. 4, 2006 (5 pages).
Patent Abstracts of Japan, Publication No. 2001-094935, Publication Date Apr. 6, 2001 (1 page).
Patent Abstracts of Japan, Publication No. 2001-243708, Publication Date Sep. 7, 2001 (1 page).
Patent Abstracts of Japan, Publication No. 2002-044609, Publication Date Feb. 8, 2002 (1 page).

* cited by examiner

*Primary Examiner*—Thai Tran
*Assistant Examiner*—Girumsew Wendmagegn
(74) *Attorney, Agent, or Firm*—Osha Liang LLP

(57) ABSTRACT

In a digital recording device, image data recorded in a recording portion has its resolution decreased to be recorded in the recording portion when it is determined that the digital recording device is not being used. In other words, when it is determined that a power switch is turned off, a system portion allows an MPEG decoder to convert a bit stream of a program data at high definition recorded in a hard disk drive to image data at low resolution and allows an MPEG encoder to convert the converted image data at low resolution to a bit stream to be stored in the hard disk drive.

8 Claims, 4 Drawing Sheets

| SEQUENCE HEADER | SEQUENCE EXTENSION PORTION | ------ | DENSITY | ASPECT RATIO | ------ |

DIGITAL RECORDING DEVICE CAPABLE OF CONVERTING AND RECORDING RESOLUTION OF IMAGE DATA OF DIGITAL TELEVISION BROADCAST AND RECORDING METHOD THEREFOR

BACKGROUND OF THE INVENTION

1. Field of the Invention

The present invention relates to a digital recording device and a recording method, and more particularly to a digital recording device converting recorded data at high definition to standard definition and a recording method therefor.

2. Description of the Background Art

A device of interest to the present invention that converts an encoding scheme of an image is disclosed for example in Japanese Patent Laying-Open No. 2001-128170. This publication discloses a configuration for encoding an image with a converted resolution to output a bit stream.

Japanese Patent Laying-Open No. 11-331613 discloses a configuration for converting a resolution of a high-definition image signal for output as a standard-definition image signal.

The conventional resolution-converting devices have been configured as described above. A high-definition image signal has been converted to a standard-definition image signal, and the image signal having a converted resolution has been encoded and stored or transmitted for display in the form of a bit stream.

In the convention resolution-conversion, however, no consideration is given to a resolution-conversion for that image data which has once been recorded. Therefore where image data recorded in a recording portion has a high definition, the data volume thereof is so large that a heavy load is imposed on the recording portion.

SUMMARY OF THE INVENTION

The present invention is therefore made to eliminate the problem described above. The object of the present invention is to provide a digital recording device capable of recording high-definition image data of a digital television broadcast inexpensively and efficiently and a recording method for the digital recording device.

A digital recording device in accordance with one aspect of the present invention receives and records a digital television broadcast at a resolution higher than a prescribed value. The digital recording device includes: a recording portion recording the received digital television broadcast; an MPEG (Moving Picture Experts Group) decoder connected to the recording portion for converting image data such that a resolution of image data of the digital television broadcast is decreased; an MPEG encoder converting image data converted by the MPEG decoder to an MPEG signal; a power switch being turned on to supply power to the digital recording device to enable a recording operation of the recording portion and being turned off to disable the digital recording device for a recording operation of the recording portion; a power switch detecting portion detecting that the power switch is turned off with the digital recording device being supplied with power; a resolution detecting portion detecting a resolution of recorded data recorded in the recording portion; and a control portion controlling a conversion of data to allow the MPEG decoder and the MPEG encoder to operate to decrease a resolution of image data having a resolution higher than the prescribed value that is recorded in the recording portion, when the resolution detecting portion determines that image data having a resolution higher than the prescribed value is included in the recording portion and the power switch detecting portion determines that the power switch is turned off.

In accordance with one aspect of the present invention, when image data at high definition is recorded in the recording portion and the power switch is turned off with the digital recording device being supplied with power, the MPEG decoder and the MPEG encoder are operated to allow high-definition image data recorded in the recording portion to be converted to standard-definition image data. Therefore it is unnecessary to provide a special chip for a resolution-conversion, and a resolution-conversion can be performed when the user does not use the digital recording device. As a result, a digital recording device capable of efficiently and inexpensively recording high-definition image data of a digital television broadcast can be provided.

A digital recording device in accordance with another aspect of the present invention receives and records a digital television broadcast at a resolution higher than a prescribed value. The digital recording device includes: a recording portion recording the received digital television broadcast; a resolution converting portion connected to the recording portion for converting image data of the digital television broadcast to have a resolution decreased by the resolution converting portion; a determination portion determining whether a user is using the digital recording device; and a control portion allowing the resolution converting portion to operate to enable the recording portion to record the image data having a decreased resolution when the determination portion determines that the digital recording device is not being used.

In accordance with another aspect of the present invention, when it is determined that the user is not using the digital recording device, high-definition recorded data is converted to standard-definition recorded data and is then stored in the recording portion. Therefore a digital recording device with an improved recording efficiency in the recording portion can be provided.

Preferably, the digital recording device in accordance with the present invention further includes a power switch being turned on to supply power to the digital recording device to enable a recording operation of the recording portion and being turned off to disable the digital recording device for a recording operation of the recording portion. The determination portion includes a power switch detecting portion detecting that the power switch is turned off with the digital recording device being supplied with power. The control portion allows the resolution converting portion to operate when the power switch is turned off.

Preferably, in the digital recording device in accordance with the present invention, the resolution converting portion includes an MPEG decoder converting image data such that a resolution of the image data of the digital television broadcast is decreased.

Since the MPEG decoder is used to convert high-definition image data to standard-definition image data, it is unnecessary to provide a dedicated chip that directly converts high-definition recorded data to standard-definition recorded data, and an exiting decoder can be used. Therefore an inexpensive digital recording device can be provided.

Preferably, in the digital recording device in accordance with the present invention, the resolution converting portion further includes an MPEG encoder converting image data converted by the MPEG decoder to an MPEG signal.

Preferably, the digital recording device in accordance with the present invention further includes a resolution detecting portion detecting a resolution of image data recorded in the recording portion. The control portion allows the resolution converting portion to convert image data such that a resolution of the image data recorded in the recording portion is decreased, when the resolution detecting portion determines that a resolution of the image data recorded in the recording portion is higher than a prescribed value.

Therefore when image data at high definition is included in recorded data recorded in the recording portion, high-definition recorded data is automatically converted to standard definition, resulting in that the recording portion can always be used efficiently.

Preferably, the digital recording device in accordance with the present invention further includes an operation time specifying portion specifying an operation time of the resolution converting portion.

Therefore since the user can specify the time at which high-definition image data in the recording portion is converted, a resolution-conversion is performed as desired by the user.

Preferably, in the digital recording device in accordance with the present invention, the recording portion is a hard disk drive.

In accordance with a further aspect of the present invention, a recording method for a digital recording device receiving and recording a digital television broadcast at high definition, includes the steps of: determining whether a user is using the digital recording device; determining whether image data having a resolution higher than a prescribed value is included in recorded image data when it is determined that the digital recording device is supplied with power and is not used; and converting and recording the image data into the recording device such that a resolution of the image data having a resolution higher than a prescribed value is decreased, when it is determined that image data having a resolution higher than a prescribed value is included.

When the recording device is supplied with power and is not used and in addition when it is determined that image data having a high definition is included in the recorded image, image data at high definition is converted to image data at standard definition and is then recorded in the recording device. Therefore the recording method allows for an efficient recording of high-definition image data in the digital recording device.

Preferably, in the recording method for a digital recording device in accordance with the present invention, the step of determining whether a user is using the digital recording device includes the step of detecting that a power switch is turned off with the digital recording device being supplied with power, the power switch being turned on to supply power to the digital recording device to enable a recording operation and being turned off to disable the digital recording device from a recording operation.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

In the following, the embodiment of the present invention will be described with reference to the figures.

Figure 1:
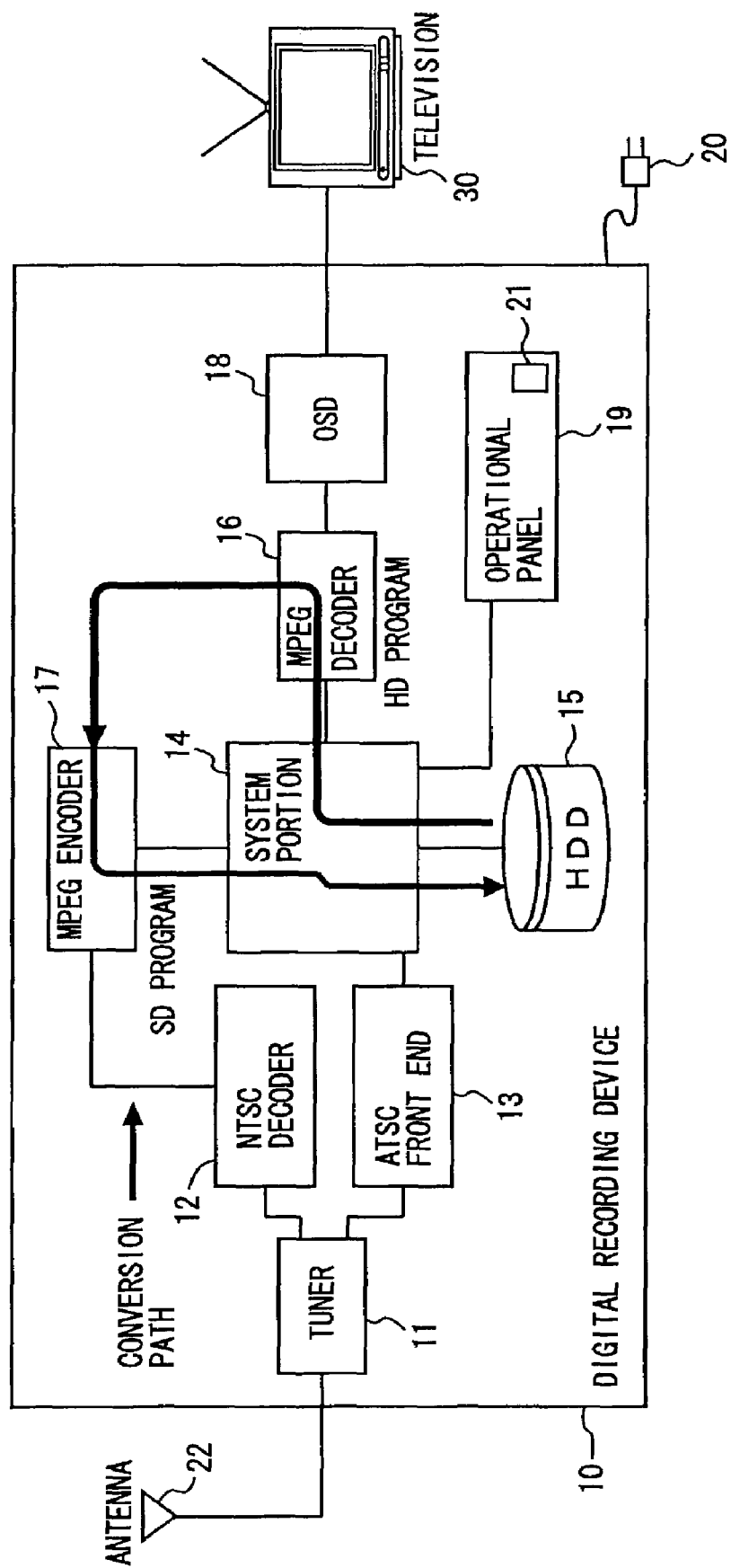
FIG. 1 is a block diagram of a digital recording device in accordance with the present invention.

Referring to FIG. 1, a digital recording device 10 includes a tuner 11 selecting a television program of an analog/digital broadcast received via an antenna 22, an NTSC (National Television System Committee) decoder 12 decoding an analog broadcast selected by tuner 11, an ATSC (Advanced Television Standards Committee) front end 13 converting a digital broadcast to a bit stream, a system portion 14 controlling the entire digital recording device 10, an HDD (Hard Disk Drive) 15 connected to system portion 14 for recording a received television program, an MPEG encoder 17 connected to NTSC decoder 12 and system portion 14 for converting analog data to an MPEG signal, an MPEG decoder 16 connected to system portion 14 for converting a bit stream read from system portion 14 to an image, an OSD (On Screen Display) 18 connected to MPEG decoder 16 for outputting an image signal to a television 30 provided outside, and an operational panel 19 connected to system portion 14 for operating digital recording device 10. Digital recording device 10 is provided with a power connection plug 20 to supply power. Operational panel 19 is provided with a power switch 21 for the user to power on/off digital recording device 10.

The user uses operational panel 19 to allow tuner 11 to select a desired television program. After selecting a program, NTSC decoder 12 converts an analog broadcast to a bit stream, and ATSC front end 13 converts a digital broadcast to a bit stream. System portion 14 outputs these bit streams to an appropriate device or reads a bit stream of a recorded program from HDD 15. When digital recording device 10 operates as a normal tuner, system portion 14 sends a bit stream only to MPEG decoder 16. MPEG decoder 16 converts the bit stream to an image. This image is graphically processed in OSD 18 and is output to television 30. When the user records a program in HDD 15, system portion 14 sends an input-bit stream to MPEG decoder 16 and records the bit stream into HDD 15 at the same time. When a recorded program is reproduced, system portion 14 reads a bit stream of a program specified by the user from HDD 15 and outputs the bit stream to MPEG decoder 16.

OSD 18 adds data for displaying a menu and a channel number on television 30, using data that specifies each recorded data registered in HDD 15. Contents such as information to be displayed on the screen of television 30 may be set in this menu using operational panel 19.

Figures 2, 3:
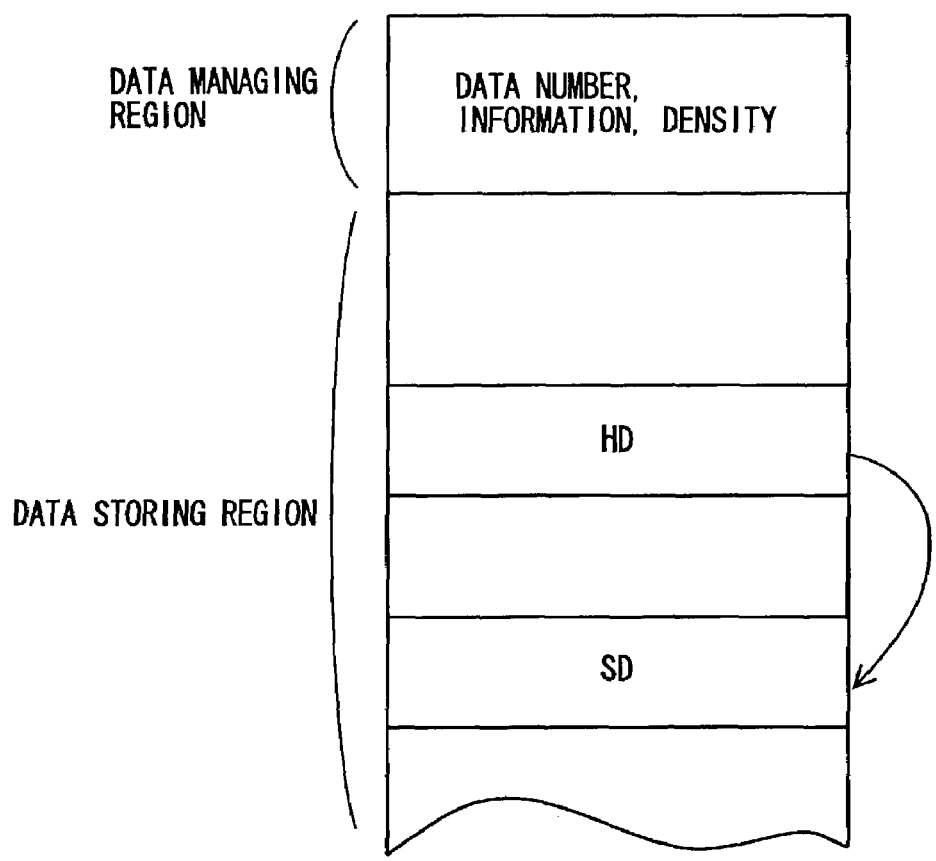
FIG. 2 shows a data structure recorded in an MPEG format.
FIG. 3 is a schematic diagram showing a recording state in a hard disk.

Referring to FIG. 2, in MPEG, a sequence header, a sequence extension portion, a resolution of an image, and an aspect ratio are registered for each image data of each television program.

Referring to FIG. 3, HDD 15 includes a data managing region and a recorded data registering region. In the data managing region, program-recording data number information that specifies image data of a recorded program and a resolution of the image data are registered for each recorded data.

The data registering region includes an HD (High Definition) image data registering region where received HD image data is registered and an SD (Standard Definition) image data registering region where SD image data having a resolution converted from HD image data is registered.

Figure 4:
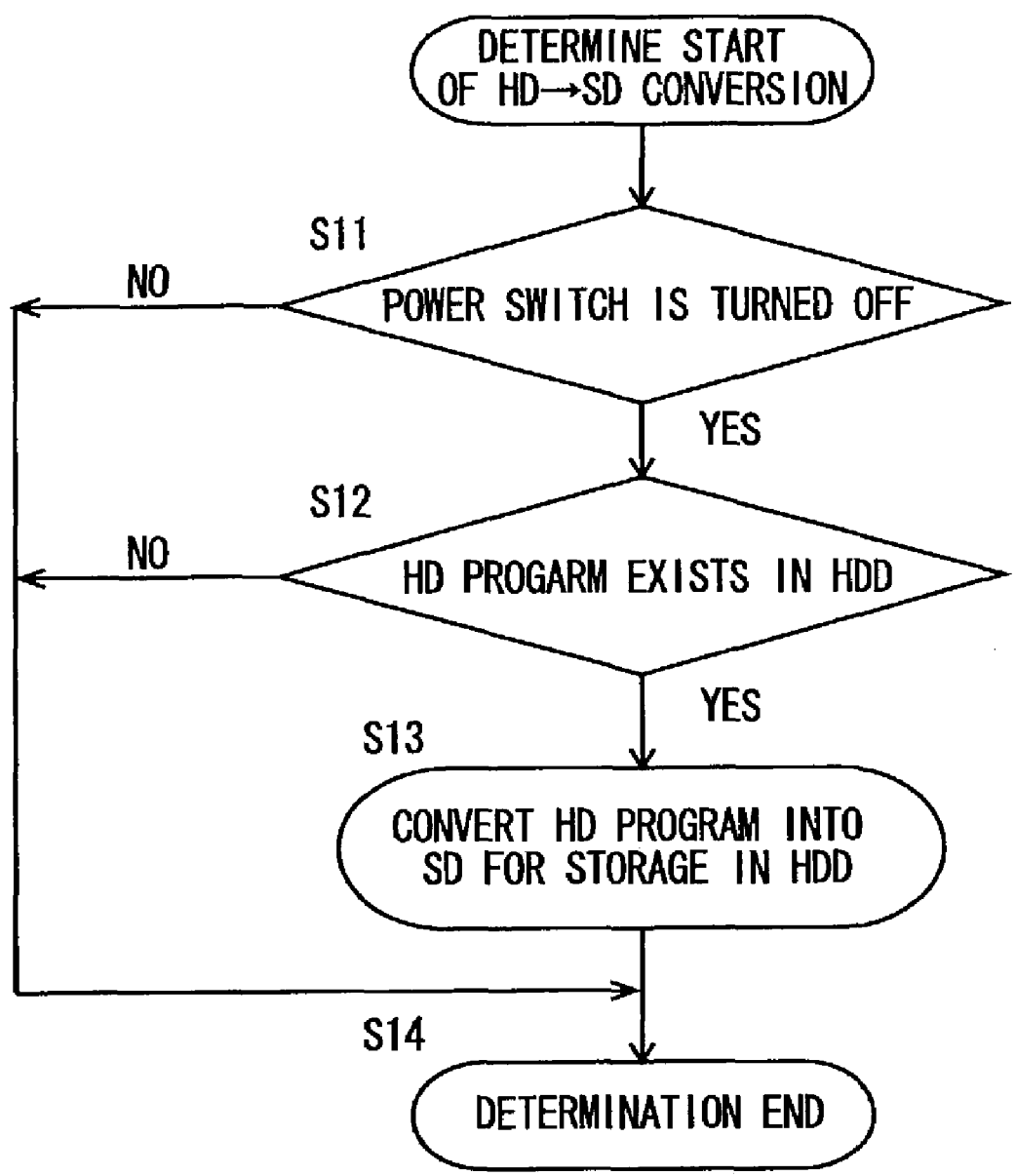
FIG. 4 is a flow chart showing a procedure of converting high-definition recorded data to standard-definition recorded data.

The operation of the digital recording device in accordance with the present invention will now be described. Referring to FIG. 4, in digital recording device 10, although power plug 20 is connected to the power supply, it is first determined whether power switch 21 of digital recording device 10 is turned off (step S11 where "step" will be omitted hereinafter). When power switch 21 is turned off (YES at S11), it is determined whether an HD program exists in HDD 15 (S12). HD program is data of the program which consists of HD mage data. At S12 if it is determined that an HD program exists (YES at S12), the HD program is converted to SD and stored in HDD 15 (S13).

When power switch 21 is not turned off (NO at S11) and when an HD program does not exist in HDD 15 (No at S12), the process will end (S14).

Figure 5:
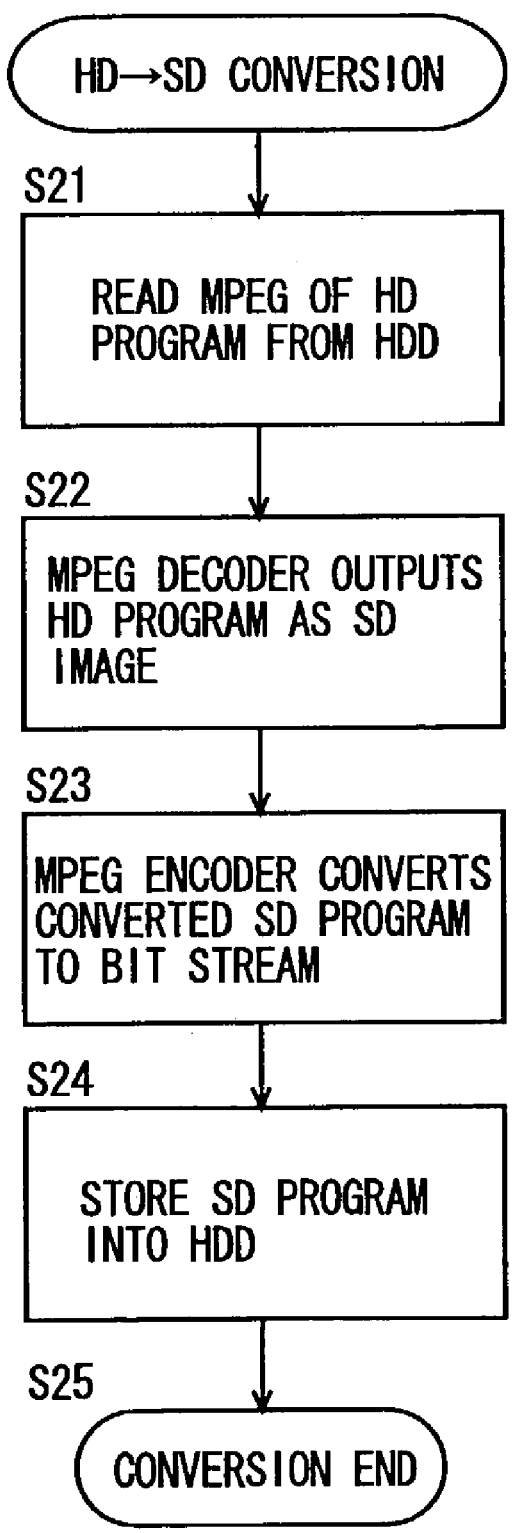
FIG. 5 is a flow chart showing a procedure of converting high-definition recorded data to standard-definition recorded data.

The process where the HD program shown at S13 in FIG. 4 is converted to SD and stored in HDD 15 will now be described. Referring to FIG. 5, MPEG data of the HD program is first read from hard disk 15 (S21). The HD program is then output from MPEG decoder 16 as an SD image (S22). The converted SD program (data of the program which consists of SD image data) is then converted to a bit stream by MPEG encoder 17 (S23). The converted bit stream is then stored in HDD 15 thereby to complete the conversion (S25). It is noted that the procedure illustrated with reference to FIG. 5 is shown with a bold line in FIG. 1.

More specifically, in the present embodiment, when power plug 20 of digital recording device 10 is connected to the power supply and power switch 21 is turned off, it is assumed that the power switch is turned off with the power being supplied to the digital recording device and the user does not use digital recording device 10. When this digital recording device is not used, system 14 searches the programs stored in HDD 15 for an HD program. As a result of the search, if an HD program is recorded in HDD 15, that HD program is converted to SD program. It is noted that the determination of whether the user is using digital recording device 10 is not limited thereto and the other method may be used.

Note that MPEG decoder 16 and MPEG encoder 17 process voice as well and uses the same signal path used for image for conversion.

An explanation for "resolution" will now be given. ATSC provides definitions of resolution. ATSC is a committee for standardization in U.S.A. that defines a format of digital television broadcast. This ATSC provides four definitions of a width-to-height resolution: (1) 1920×1080 (2) 1240×720 (3) 704×480 and (4) 640×480. Among these, data over 480 in the height is referred to as HD data.

Therefore a conversion from data (1) or (2) to data (4) as described above is referred to as a conversion from HD to SD. It is noted that the definition of resolution is not limited thereto.

System 14 stores each recorded data in HDD 15 as shown in FIG. 3 and searches for HD image data for successive conversion to SD image data with reference to this data.

The user may enter the time to start a resolution-conversion to SD, in operational panel 19.

When system 14 starts the operation of converting HD image data to SD image data irrespective of the user's intention when power switch 21 is turned off, the user may turn on power switch 21 to watch recorded data again on television 30. In this case, data may be interrupted halfway during conversion of HD image data, resulting in incomplete SD image data. If the user enters the time at which the resolution conversion is started, such a problem can be avoided.

It is noted that an input to operational panel 19 is not limited to the input of the start time as described above, and a resolution-conversion starting switch may simply be provided for the user to operate.

Although in the embodiment described above one hard disk drive (HDD 15) is used by way of illustration, the present invention is not limited thereto and separate hard disks for recording HD image data and for recording SD image data may be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital recording device configured to receive and record a digital television broadcast at a higher resolution than a prescribed value, comprising:
   a recording portion configured to record said received digital television broadcast;
   a resolution converting portion connected to said recording portion and configured to convert image data of the digital television broadcast into converted image data having decreased resolution;
   a power switch, wherein when the power switch is on, a recording operation of said recording portion is enabled, and when the power switch is off, a recording operation of said recording portion is disabled;
   a power switch detecting portion configured to detect when said power switch is off while said digital recording device is supplied with power; and
   a control portion configured to allow said resolution converting portion to enable said recording portion to record the converted image data when said power switch detecting portion determines that said power switch is off.

2. The digital recording device according to claim 1, wherein
   said resolution converting portion includes an MPEG decoder configured to convert the image data such that the resolution of the image data of said digital television broadcast is decreased.

3. The digital recording device according to claim 2, wherein
   said resolution converting portion further includes an MPEG encoder configured to encode the converted image data as an MPEG signal.

4. The digital recording device according to claim 1, further comprising a resolution detecting portion configured to detect the resolution of the image data recorded in said recording portion, wherein
   said control portion allows said resolution converting portion to convert the image data into the converted image data when said resolution detecting portion determines that the resolution of the image data recorded in said recording portion is higher than the prescribed value.

5. The digital recording device according to claim 1, further comprising an operation time specifying portion configured to specify an operation time of said resolution converting portion.

6. The digital recording device according to claim 1, wherein said recording portion comprises a hard disk drive.

7. A recording method for a digital recording device configured to receive and record a digital television broadcast at high definition, comprising:
   detecting when a power switch is off while said digital recording device is supplied with power, wherein when said power switch is on, a recording operation is enabled, and when said power switch is off, a recording operation is disabled, determining whether recorded image data has a resolution higher than a prescribed value when it is determined that said power switch is off while said digital recording device is supplied with power; and converting and recording the image data into said recording device such that the resolution of the image data is decreased, when it is determined that the resolution of the image data is higher than the prescribed value.

8. A digital recording device configured to receive and record a digital television broadcast at a higher resolution than a prescribed value, comprising:

a recording portion configured to record the received digital television broadcast;

an MPEG decoder connected to said recording portion and configured to convert image data of the received digital television broadcast into converted image data having a decreased resolution;

an MPEG encoder configured to encode the converted image data as an MPEG signal;

a resolution detecting portion configured to detect the resolution of the image data recorded in said recording portion;

a power switch, wherein when the power switch is on, a recording operation of said recording portion is enabled, and when the power switch is off, a recording operation of said recording portion is disabled;

a power switch detecting portion configured to detect when said power switch is off while said digital recording device is supplied with power; and a control portion configured to control a conversion of data, wherein when said resolution detecting portion determines that the resolution of the image data recorded in said recording portion is higher than said prescribed value and said power switch detecting portion determines that said power switch is off, then said MPEG decoder and said MPEG encoder decrease the resolution of the image data.

* * * * *